Figure 4:
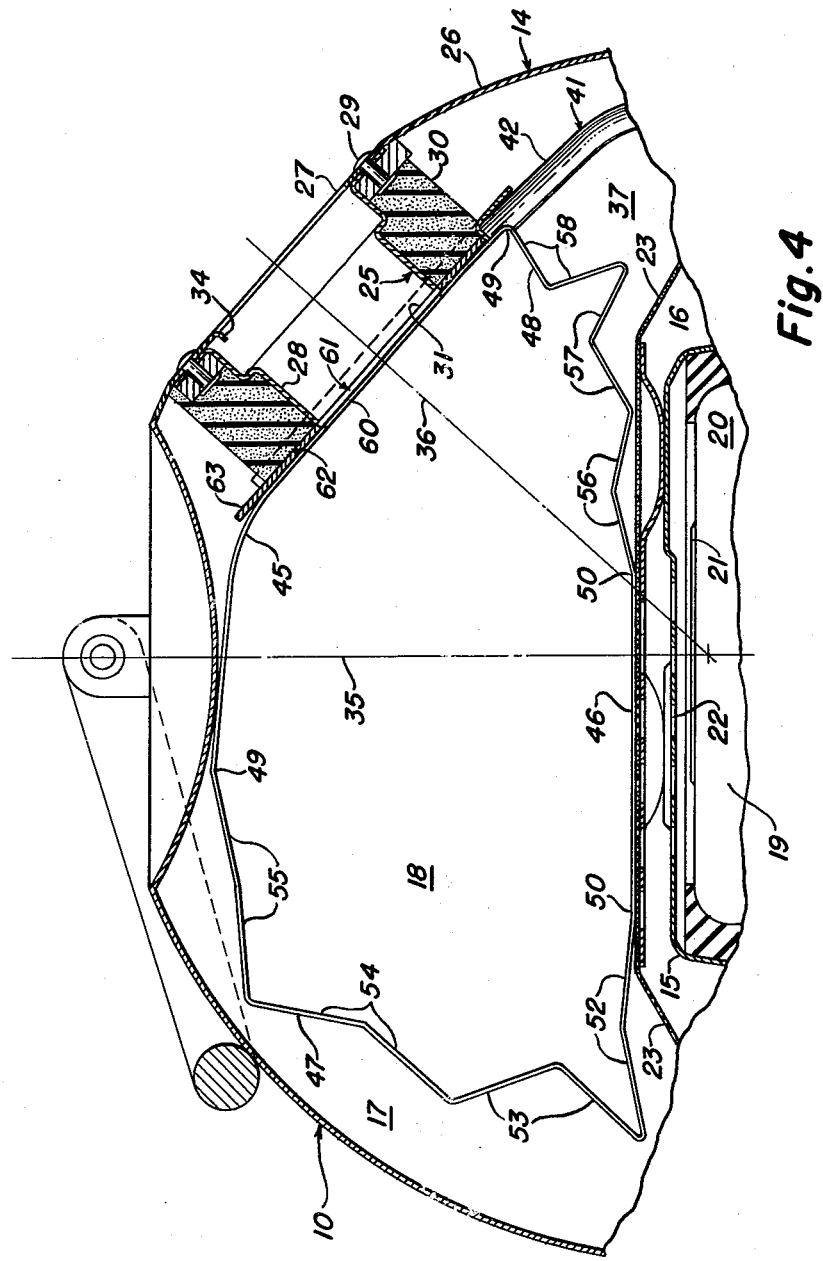

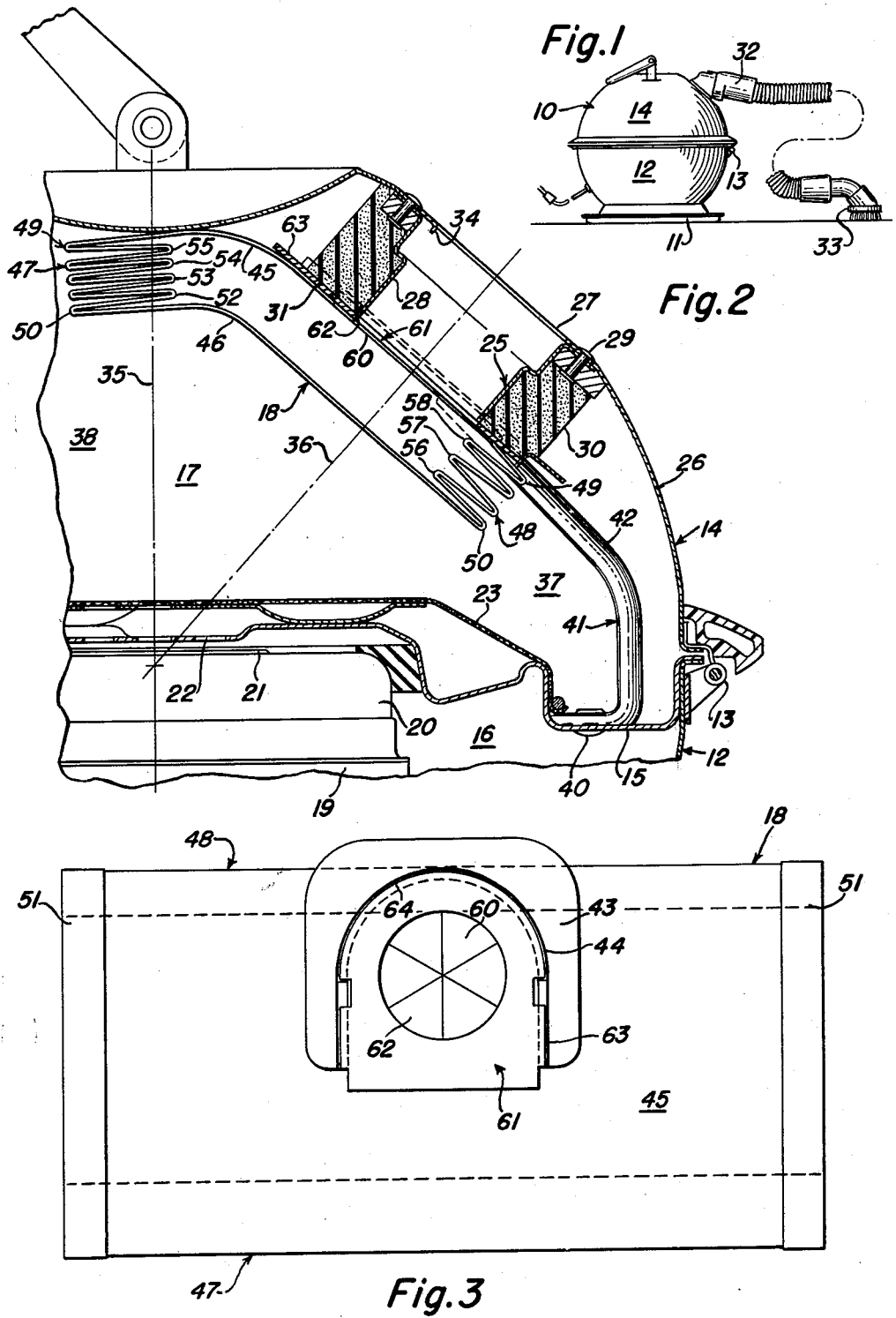

United States Patent Office 2,980,205
Patented Apr. 18, 1961

2,980,205

SUCTION CLEANERS

Werner G. Seck, Canton, Ohio, assignor to The Hoover Company, North Canton, Ohio, a corporation of Ohio Filed June 19, 1959, Ser. No. 821,539

6 Claims. (Cl. 183—51)

The present invention relates to suction cleaners and more particularly to a filter bag having opposed walls of different areas which when the bag is inflated constricts expansion of one wall in comparison to the other wall.

An object of the invention is to provide a filter bag with opposed walls which expand to different extents when the bag is inflated. Another object is to provide a filter bag having opposed walls each composed of a different number of pleats whereby when the bag is inflated one wall area is constricted in expansion in comparison to the other wall. A further object is to provide a filter bag with opposed pleated walls, the pleats in one wall being of less depth than in the other wall to effect constricted expansion of the one wall in comparison to the other wall when the bag is inflated. Another object is to provide a suction cleaner having a filter chamber and an air inlet leading into a constricted area of the chamber. A further object is to provide the foregoing suction cleaner with a filter bag so secured to the air inlet to arrange the constricted area of the bag in the reduced area of the filter chamber. Other objects and advantages of the invention will become apparent from the following description and drawings, wherein:

Figure 1 is an elevational view on reduced scale showing the general spherical contour of the cleaner body, Figure 2 is a sectional view showing the bag non-inflated and arranged in the filter chamber, Figure 3 is a top plan view of the bag and a portion of the bag support, and Figure 4 is a sectional view of the filter chamber showing the bag therein and inflated.

The embodiment of the invention herein disclosed comprises a suction cleaner body 10 of substantially spherical contour having a supporting base 11 and a lower casing section 12 to which is hinged at 13 a movable upper casing section 14. A partition 15 divides the body 10 into a pressure chamber 16 and a filter chamber 17 and disposed in the latter is a bag 18. A motor-fan unit 19 is mounted in the pressure chamber 16 and has a fan chamber 20 provided with an inlet 21 communicating through ports 22 in the partition 15 with the filter chamber 17 to create suction in the latter when the motor is energized. A final filter 23 overlies the ports 22 and is suitably attached to the partition 15.

An air inlet connection indicated generally at 25 is attached to the wall 26 of the movable upper casing section 14 and includes an air inlet port 27 in the wall 26, a sleeve 28 attached by rivets 29 to the wall 26 and a resilient ring 30 surrounds the sleeve 28 and has a lower surface 31 which seats against the filter bag 18. A hose 32 provided with a cleaning tool 33 is removably attached to a detent 34 in the port 27 for conveying a dirt laden air stream to the bag 18. The filter chamber 17 is shaped substantially hemispherically and the air inlet connection 25 is arranged between the central longitudinal axis 35 of the cleaner body 10 and the peripheral edge of the partition 15 adjacent the hinge 13, whereby the inlet port 27 is offset with respect to the filter chamber 17 and has its central axis 36 directed downwardly at an inclined angle toward the partition 15. The portion 37 of the filter chamber 17 to the right of the central axis 36 of the inlet port 27, as viewed in Figures 2 and 4, is constricted in area in comparison to the remaining portion 38 of the filter chamber 17 to the left of the axis 36.

Mounted by rivets 40 on the partition 15 is a bag support 41 comprising an upstanding arm 42 extending along the inner surface of the upper casing section wall 26 and terminates in a bifurcated portion 43 having a shouldered seat 44 the entrance to which is directed toward the central axis 35 of the cleaner body to receive the bag 18.

The filter bag 18 is substantially flat prior to use and includes a top wall 45 and a bottom wall 46 forming the principal walls, and opposed side walls 47—48 joined to the longitudinal edges 49 and 50 respectively of the upper and lower walls. The opposite ends of the bag are secured together by a tape 51 which prevents expansion of the side walls 47—48 in the area of the tape 51. The side wall 47 includes four pleats 52, 53, 54 and 55 and the opposite side wall 48 has three pleats 56, 57 and 58. Each of the pleats are folded inwardly of the top and bottom walls 45 and 46 respectively. It will be noted that the depth of the pleats 52 to 55 in the side wall 47 are greater than the depth of the infolded pleats 56 to 58 in the side wall 48. The greater number of pleats in the side wall 47 provides larger filtering area in comparison to the side wall 48 whereby when the bag is inflated the side wall 47 expands to a greater extent between the top and bottom walls than does the side wall 48. Also since the pleats 52 to 55 are of greater depth in comparison to the pleats 56 to 58 more filtering area is provided in the side wall 47 than in the side wall 48 whereby the latter is constricted and expands to a lesser extent than the side wall 47. The top wall 45 is provided with an air inlet 60 arranged adjacent the constricted side wall 48 and a relatively stiff mounting collar 61 is secured to the top wall 45 and has an opening 62 in alignment with the inlet 60. The collar 61 is secured to the top wall 45 in the area adjacent the inlet 60 so that the marginal edge 63 of the collar is free of the bag to form a bag supporting flange. The bag flange 63 of the collar 61 is formed complementary to the seat 44 on the bag supporting arm 41 so that the bag flange rests on the seat 44 and the bag is suspended therefrom.

In order to attach the bag 18 to the cleaner the operator lifts the upper casing section 14 about the hinge 13 to expose the bifurcated seat 44 which has its mouth directed toward the central axis 35 of the cleaner body 10. The bag 18 which is collapsed and flat is grasped by the collar 61 and the circular portion 64 is initially inserted through the entrance of the bifurcated seat 44 and thereafter moved inwardly until the flange 63 rests on the seat 44 to suspend the bag therefrom. The upper casing section 14 is then closed causing the lower face 31 of the resilient ring 30 to bear against the collar 61 and form an airtight seal therebetween.

The collar 61 being offset with respect to the longitudinal axis of the bag and arranged adjacent to the constricted side wall 48 positions the major portion of the bag to the left of the air inlet 27 and in the larger area 38 of the filter chamber 17 and the constricted side wall 48 is arranged in the smaller area 37 of the filter chamber, as shown in Figure 2.

When it is desired to perform a cleaning operation the hose 32 is attached to the air inlet connection 25 and the motor-fan unit energized which causes a dirt laden air stream to flow through the cleaning tool 33 and hose 32 into the filter bag 18. The incoming air stream inflates the bag 18 causing the opposed walls 47 and 48 to expand. The small pleats 56 to 58 in the side wall 48 expand in the constricted area 37 of the filter chamber 17 and the large pleats 52 to 55 in the side wall 47 distend into the greater area 38 of the chamber 17 between the longitudinal edges 49 and 50 of the upper and lower bag walls, as shown in Figure 4.

It will be noted that the bag when inflated occupies substantially the entire area of the filter chamber and that the pleated walls are fully expanded to utilize all the filtering area of the bag.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. In a suction cleaner, a filter chamber, an air inlet connection for said chamber offset with respect to the central axis of said filter chamber to provide a constricted chamber area at one side of said inlet in comparison to the chamber area at the other side of said inlet, a filter bag in said chamber and having opposed principal walls joined by spaced side walls, one of said side walls having less area than the other side wall, a mouth in one of said principal walls attached to said inlet connection for passage of a dirt laden air stream into said bag, said bag arranged in said chamber with respect to said inlet connection to position said one side wall in the constricted area of said chamber and said other side wall in the larger area of said chamber, whereby when said bag is inflated said one side wall expands a lesser extent in said constricted area of said chamber than said other side wall in the larger area of said chamber.

2. A suction cleaner according to claim 1, in which said bag mouth is arranged in said one principal wall adjacent to said one side wall having less expansible area, whereby said bag is positioned in said filter chamber with the less expansible side wall disposed in said constricted area of the filter chamber.

3. A filter bag for use in suction cleaners comprising an elongated body having opposed principal walls, means defining an opening in one of said principal walls adapted to be connected to an air inlet of a suction cleaner for admission of a dirty air stream into the bag, said principal walls joined along their corresponding longitudinal edges by opposed pleated walls, whereby the bag is substantially flat when said pleats are collapsed prior to connecting the bag to the cleaner air inlet, one of said pleated walls having less wall area than the other pleated wall whereby said one pleated wall expands to a lesser extent between said opposed principal walls than said other pleated wall when the bag is inflated by the air stream passing through the suction cleaner air inlet into the bag.

4. A filter bag as described in claim 3, and said one pleated wall having a less number of pleats than in said other pleated wall whereby the latter expands a greater distance between said principal walls than said one pleated wall.

5. A filter bag as described in claim 3, and the pleats in said one pleated wall being of less depth relative to the adjacent longitudinal edges of said principal walls than the pleats in said other wall whereby said one pleated wall expands to a lesser extent than said other pleated wall when the bag is inflated.

6. A filter bag as described in claim 3, and said bag opening in said one principal wall being offset with respect to its longitudinal axis and arranged adjacent to said one pleated wall.

References Cited in the file of this patent

UNITED STATES PATENTS

| 1,124,684 | Allen | Jan. 12, 1915 |
| 1,856,133 | McClatchie | May 3, 1932 |
| 1,970,666 | Martinet | Aug. 21, 1934 |
| 2,758,667 | Brace | Aug. 14, 1956 |
| 2,771,152 | Bramhall et al. | Nov. 20, 1956 |
| 2,784,800 | Segesman | Mar. 12, 1957 |
| 2,804,164 | Brace | Aug. 27, 1957 |
| 2,810,453 | Kemnitz | Oct. 22, 1957 |